United States Patent [19]

English et al.

[11] Patent Number: 5,339,875
[45] Date of Patent: Aug. 23, 1994

[54] LIQUID PREPARATION METHOD

[75] Inventors: David G. N. English, Rickmansworth, United Kingdom; Raymond H. Glabach, Fort Collins, Colo.

[73] Assignee: Eastman Kodak Company, Rochester, N.Y.

[21] Appl. No.: 84

[22] Filed: Jan. 4, 1993

[30] Foreign Application Priority Data

Feb. 8, 1992 [GB] United Kingdom ............... 9202702

[51] Int. Cl.$^5$ .............................................. B65B 3/28
[52] U.S. Cl. ............................................ 141/9; 141/83; 141/104; 141/105; 430/347
[58] Field of Search ................... 141/1, 4, 9, 103, 104, 141/105, 83; 430/347, 567

[56] References Cited

U.S. PATENT DOCUMENTS

| | | |
|---|---|---|
| 2,685,393 | 8/1954 | Thompson . |
| 2,995,158 | 8/1961 | Oberg . |
| 3,219,416 | 11/1965 | Natelson . |
| 3,653,414 | 4/1972 | Weidner ............... 141/4 |
| 4,383,041 | 5/1983 | Kutsusawa et al. . |
| 4,628,974 | 12/1986 | Meyer . |
| 4,675,163 | 6/1987 | Mybeck . |
| 4,692,308 | 9/1987 | Riley et al. . |
| 4,913,198 | 4/1990 | Hayahara et al. ............ 141/83 |
| 4,959,947 | 10/1990 | Reif . |
| 5,027,869 | 7/1991 | Tsumura et al. ............ 141/104 |
| 5,038,839 | 8/1991 | Morimoto et al. ............ 141/83 |

OTHER PUBLICATIONS

Takahashi et al, Demonstration of Pipeless Chemical Plant, Toyo Engineering Co., Ltd. 1989.
Shimada et al, Multipurpose Pipeless Reaction/Mixing System, Mitsubishi Heavy Industry Co., Ltd., 1989.
Shimada et al, Multipurpose Pipeless Reaction-Mixing System, Mitsubishi Heavy Industries, Ltd., 1990.
Takahashi et al, A Proposal of Pipeless Chemical Plant "MILOX", Toyo Engineering Co., Ltd., 1990.

Primary Examiner—Ernest G. Cusick
Attorney, Agent, or Firm—Paul A. Leipold

[57] ABSTRACT

According to the present invention we provide a method for the preparation of a liquid for supplying to one or more pieces of apparatus using such a liquid characterized in that one or a plurality of vessels visit one or more preparation stations until the liquid is prepared, and the liquid when prepared is continually supplied to the apparatus in batches by at least one vessel, the rate of liquid preparation and the vessel movements being matched to the requirements of each preparation station and/or each piece of apparatus. Preferably a plurality of vessels visit the preparation stations.

27 Claims, 4 Drawing Sheets

LIQUID PREPARATION METHOD

FIELD OF THE INVENTION

This invention relates to a method for the preparation of a liquid such as a dispersion and in particular to a method for the preparation of a dispersion (usually termed a silver halide emulsion) to be coated onto a support in the production of photographic film or paper.

BACKGROUND OF THE INVENTION

In the photographic industry dispersions (usually termed emulsions) of silver halides are prepared and are coated onto film or paper supports. These dispersions are prepared by a complicated process having a significant number of steps and generally involving storage of the dispersion before it is used as a coating material.

The transport of liquids around a system using vessels which move from place to place in the system is used in automated analytical techniques such as are described in U.S. Pat. Nos. 4,383,041 and 4,692,308 and in beverage vending machines such as that described in U.S. Pat. No. 2,995,158. The movement of materials around "pipeless" chemical plants using vessels travelling about the plants has been described in general terms by a number of Japanese authors:

1. "Multipurpose Pipeless Reaction-Mixing System'"—T. Shimada, S. Omoto, A. Nakamoto & O. Funamoto—Mitsubishi Heavy Industries Ltd.;
2. "Multipurpose Pipeless Reaction/Mixing System'"—T. Shimada, S. Omoto & A. Nakamoto—Mitsubishi Heavy Industries Ltd.;
3. "Demonstration of Pipeless Chemical Plant"—K. Takahashi, H. Fujii, K. Shima & O. Okuda—Toyo Engineering Co. Ltd.; and
4. "Towards AI Batch Plants—A Proposal of Pipeless Chemical Plant 'MILOX'"—K. Takahashi, H. Fujii, K. Shima & O. Okuda—Toyo Engineering Co. Ltd.

Such plants, which are advocated for use in multiproduct - small volume systems, are not described in great detail.

PROBLEM TO BE SOLVED BY THE INVENTION

There is a general need for continuing improvements in the process whereby photographic dispersions are made and coated onto supports. In particular there is a need for improvements in emulsion making and coating processes, particularly for small batches of photographic materials.

SUMMARY OF THE INVENTION

According to the present invention we provide a method for the preparation of a liquid for supplying to one or more pieces of apparatus using such a liquid characterized in that one or a plurality of vessels visit one or more preparation stations until the liquid is prepared, and the liquid when prepared is continually supplied to the apparatus in batches by at least one vessel, the rate of liquid preparation and the vessel movements being matched to the requirements of each preparation station and/or each piece of apparatus.

Preferably a plurality of vessels visit the preparation stations.

ADVANTAGEOUS EFFECT OF THE INVENTION

The method of the invention gives significant advantages in two main areas as follows:
(i) reduced costs through reductions in labour, waste, inventories and eliminated processes; and
(ii) reduced cycle time giving flexibility and competitive advantage through small units, and through accelerated product introduction by eliminating scale-up Reducing the batch size in emulsion manufacturing and a continuous link to coating offers the advantages of reduced manufacturing cycle time, reduced work-in-progress, faster response to customer orders, ability to produce smaller orders economically, capability to make custom orders of small run size and reduction of new product development time and development cost.

DETAILED DESCRIPTION OF THE INVENTION

Figure 1:
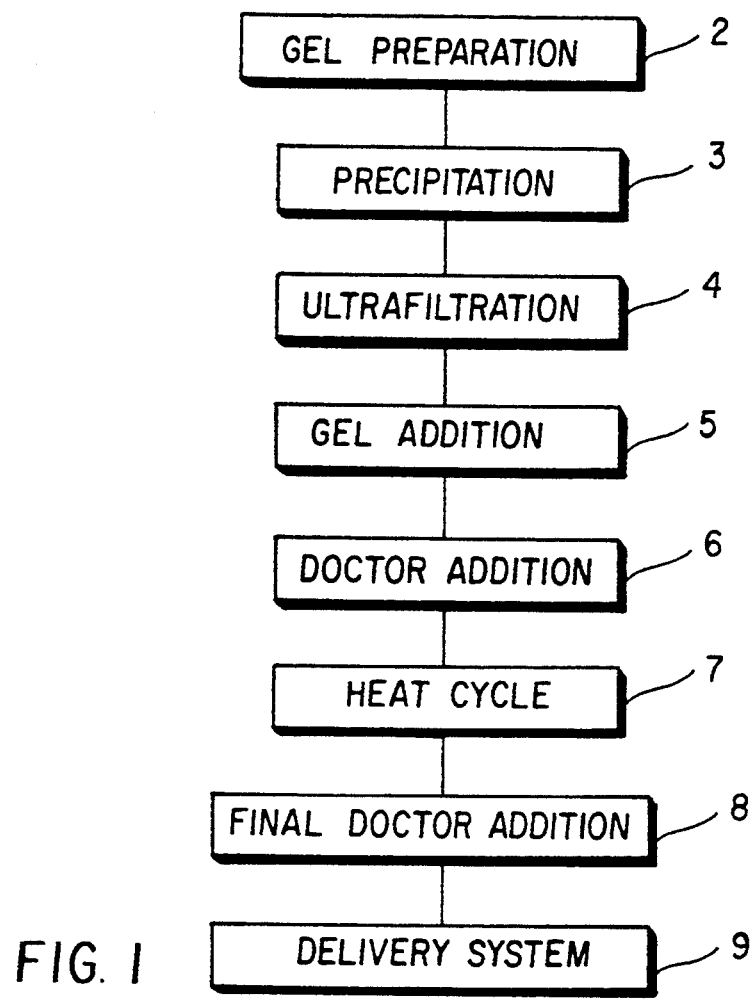
FIG. 1 is a diagram showing the process flow design.

The method of the invention can readily be applied in the preparation of any liquid, e.g., a solution, liquid mixture or a dispersion such as the dispersions or emulsions used to coat photographic film or paper. In this last case the dispersion after preparation is supplied to a machine which applies the coating to a film or other support. In this specification the invention will generally be described in relation to the preparation of film coating emulsion. The invention can however be applied to the production of other liquids for example high value liquids, and particularly liquids where human contact is not desirable. Such liquids include pharmaceuticals, cosmetics, pesticides, herbicides and feedstuffs.

When the method of the invention is used to prepare a photographic film coating emulsion, the stations for the preparation steps are suitably placed in spaced relation to one another so that vessels can easily carry liquids from one step to the next in the preparation method. Preferably vessels are used to transport liquids throughout the method, but they can be used in some or one step only, liquid transport in the remaining steps being by, e.g., pipes. The movements of the vessels are matched to the requirements of each preparation station and/or of each piece of apparatus; for example, a vessel will deliver material to be treated in a step when the preparation station involved is ready to treat it. Movement of the vessels can be achieved by any means, even by hand. Preferably movement is by conveyor, automatic guided vehicle (AGV) or elevator. It is preferred that vessels are raised into position at each station to afford an opportunity for completely draining the equipment at that station on completion of its function, by lowering the vessel and pausing before its next transfer. This helps to reduce losses and to give a more consistant product. Additionally it provides an opportunity to weigh the vessel and its contents at any or each station to check or control the functioning of addition operations. Alternatives for AGV use include (a) a vessel attached to a hoist on an AGV which remains with it or (b) free-ranging AGV's which deliver vessels to station mounted hoists and leave them there. Preferably the movement of the vessels is part of an automated system with a central control. In one embodiment all the process stations are automatic being controlled with one central computer system. This has great advantages since the method is to be carried out in the dark. An example of a process to which the method of the invention can be applied is an emulsion production line for film coating having the following specified modules, between which small (e.g. capacity 180 liters) open vessels move.

The modules of the production line include:
1. Charging (gel dissolution, heating, ion-concentration adjustment)
2. Precipitation
3. Washing, e.g., by ultrafiltration
4. Doctoring, i.e., introduction of chemical additives such as sensitisers, etc.
5. Heat cycle
6. Delivery
7. Vessel washing These modules may be used at different stages of the process (e.g., charging with additional gel before doctoring). To increase capacity more of each module may be used. Preferably the vessel size is low in order to obtain efficient coatings down to one roll, and to reduce scale-up problems when transferring from research to full-scale production.

The vessels used preferably have a capacity in the range 50 to 1000 liters. They can be of any shape, but vessels having conical bottoms are preferred. Variations in the volume of material carried in different parts of the method can be allowed for by the movement of vessels between different stirrer configurations. Preferably the vessels are insulated but not jacketed. Preferably also the vessels do not have bottom valves (to give better reliability, cleanliness, and simplicity). Heating and cooling at stages where necessary can be by any suitable means, e.g., by water-filled baffles or coils. No connections are then required between the station and each vessel. The vessels may be constructed using any suitable material, e.g., steel, plastic, etc, and may be disposable.

The emulsion produced by the method is delivered in batches as required to a coating machine to be coated onto a photographic support without any storage or blending.

The invention is illustrated by the accompanying drawings which show a system for preparing a photographic emulsion. The system has seven operating steps, in addition to a delivery system, which are carried out at four stations.

Figure 4:
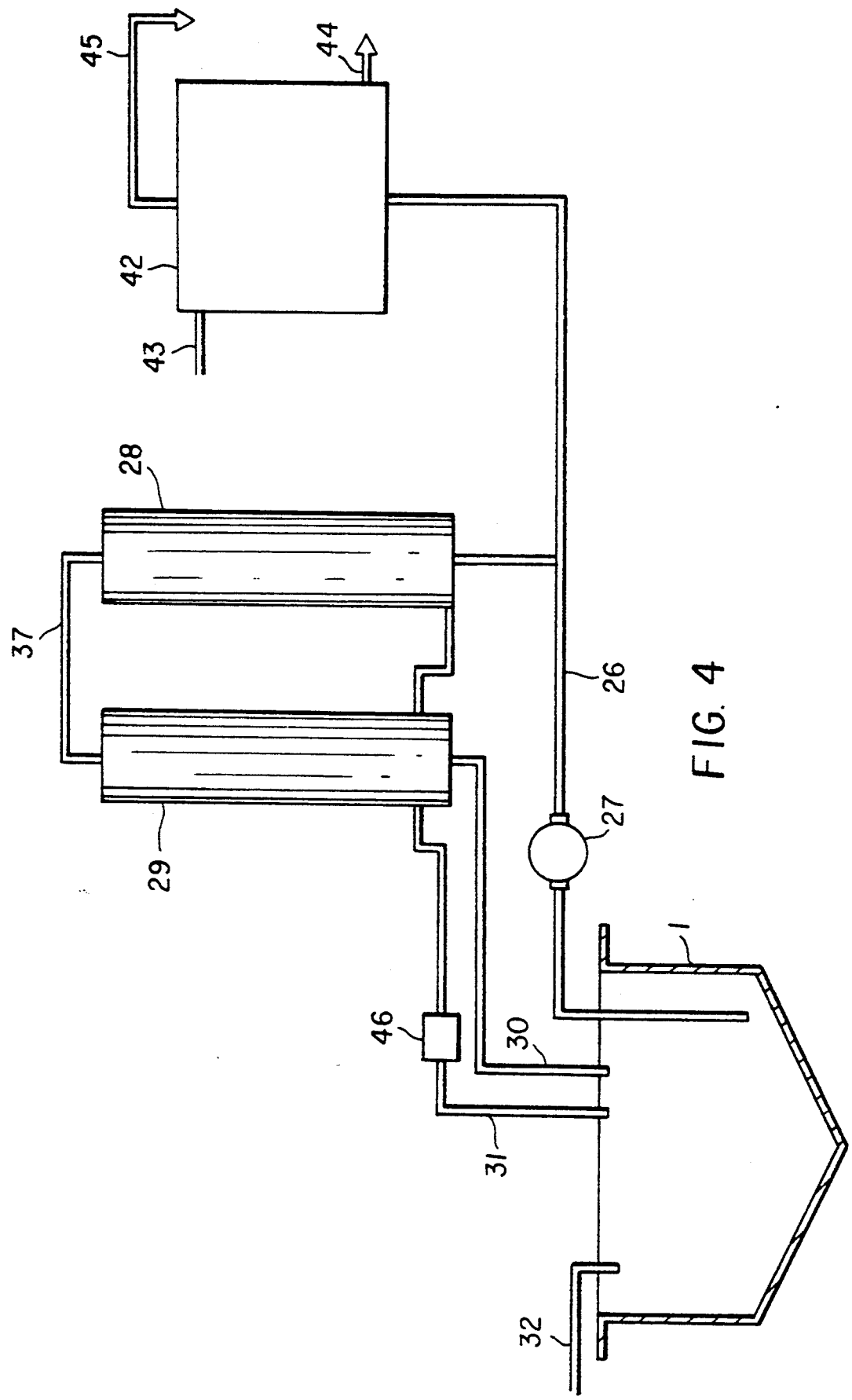
FIG. 4 is a diagram showing ultrafiltration station C.
Figure 5:
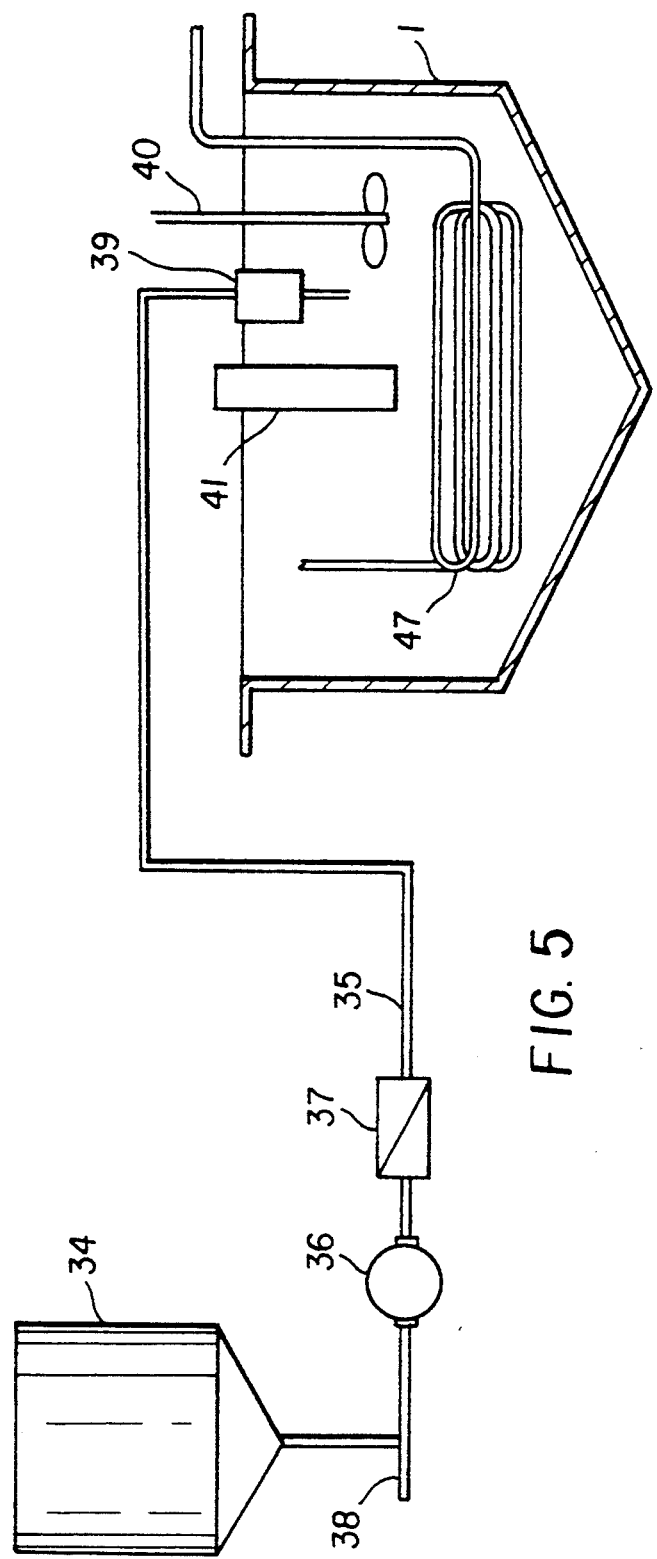
FIG. 5 is a diagram showing doctoring station D.

FIGS. 2 to 5 all show a vessel 1 at the stations A to D respectively illustrated therein. In FIG. 4 only the upper part of vessel 1 is shown.

The process flow design shown in FIG. 1 comprises the seven operating steps summarised below together with delivery system 9 which carries product emulsion on to a coating machine (not shown in the drawings).

Figure 2:
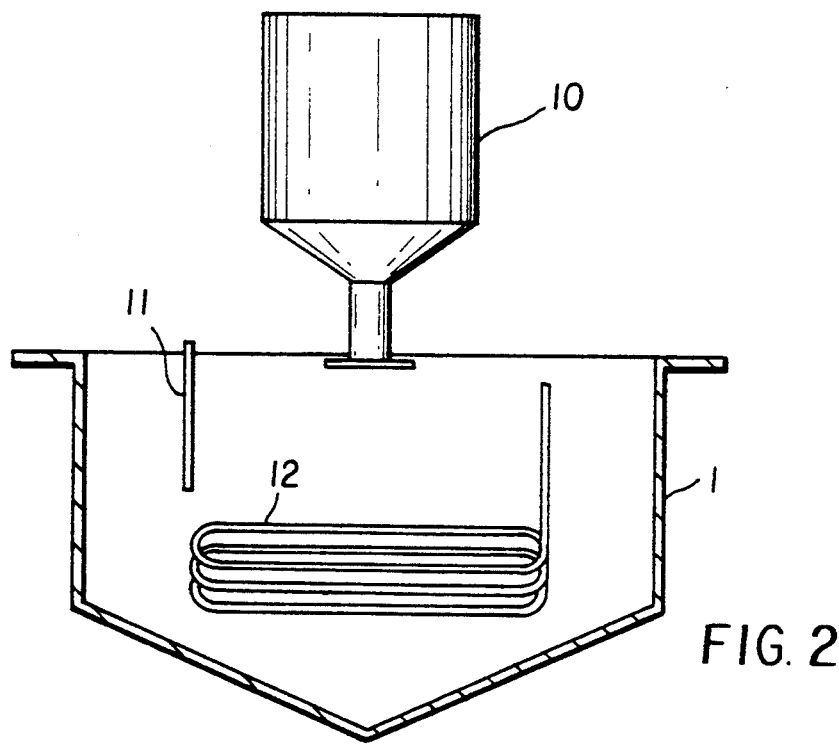
FIG. 2 is a diagram showing making station A.
Figure 3:
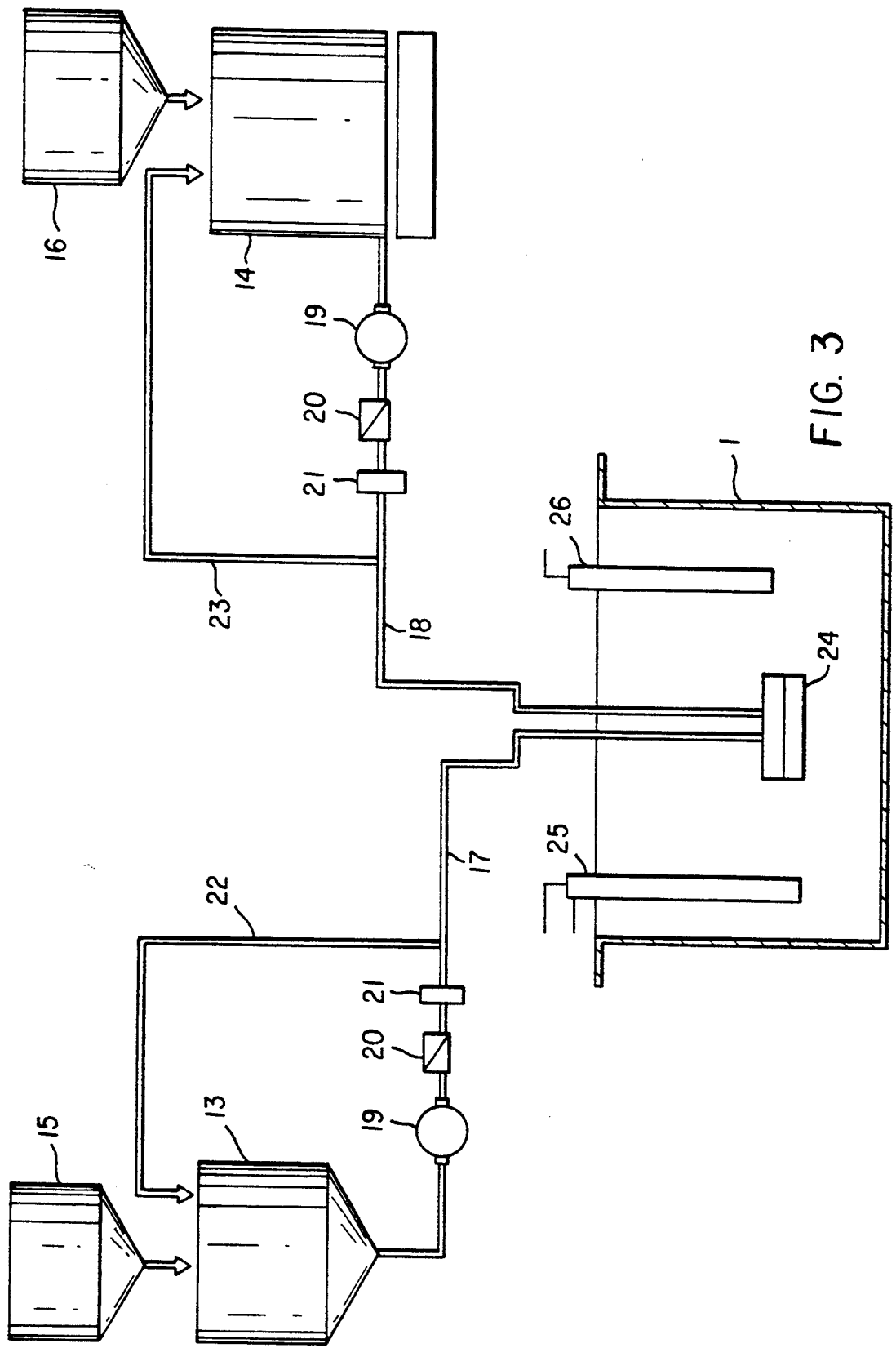
FIG. 3 is a diagram showing precipitation station B.

The first step, shown in box 2 of FIG. 1, is a gel preparation step and is carried out at making station A (shown in detail in FIG. 2). In the gel preparation step vessel 1 (known generally in the photographic industry as a "kettle") is positioned below gel dispenser 10 from which gelatin and water are added to the vessel and are mixed together by mixer 11. During this step the temperature is raised to a level suitable for the second step, e.g. to a temperature in the range 40° to 80° C., using coil 12 which may also be used to cool the contents of vessel 1.

From station A vessel 1 passes to station B at which the second step, a precipitation step, is carried out (box 3 of FIG. 1). In the second step a solution containing silver nitrate (known as the "silver" solution) and a solution containing a suitable halide, e.g. an ammonium or alkali metal halide such as sodium bromide, (known as the "salts" solution) are added to vessel 1 in metered amounts from tanks 13 and 14 respectively. The solutions have been prepared in tanks 15 and 16 respectively. They are supplied to vessel 1 along conduits 17 and 18 respectively, both conduits containing pumps 19, flow meters 20 and check valves 21. Conduits 17 and 18 have re-cycle conduits 22 and 23 respectively. The salts and silver solutions are added to vessel 1 through 24 which is also a stirrer positioned below the surface of the material therein and precipitation of a silver halide takes place having been produced by reaction of silver nitrate with halide in the presence of gelatin. During the second step the temperature of the material in vessel 1 is maintained at a value in the range 40°–80° C. using heating baffles such as 25. Vag and pH are monitored using probes such as 26.

From station B vessel 1 passes to station C at which the third step (the ultrafiltration step) is carried out (box 4 of FIG. 1). This station serves two purposes in this system. In the third step it is used essentially as a washing station while at a later step (the fifth step) it is used as a heat exchange station. In the third step the material in vessel 1 is pumped out along conduit 26 using pump 27 through permeaters 28 and 29. These permeaters allow water and undesirable salts to be separated from silver halide and gelatin. Means are provided in connecting conduit 37 for adding water and/or air. After leaving permeater 29 a concentrated stream of gelatin and silver halide is returned to vessel 1 along conduit 30 and permeate passes via conduit 31 containing flowmeter 46 to a drain. Warm demineralised water is added through pipe 32 to the material returned to vessel 1 to replace permeate which has been removed.

From station C vessel 1 returns to station A for addition of more gelatin in the fourth step (gel addition step) (box 5 of FIG. 1). After this additional gelatin addition vessel 1 passes to station D at which the fifth step (doctor addition step) (box 6 of FIG. 1) is carried out. In the fifth step a variety of additives (generally known as doctors) are added to vessel 1 through doctor delivering units such as that shown in FIG. 5. Usually there will be a number of these units. For instance, a system having 30 units could make any of up to 5 different products without changing. In the system under consideration each doctor delivering unit adds a set measured amount of one additive to vessel 1. The unit has doctor vessel 34 from which a particular additive is supplied to vessel 1 along conduit 35 which contains pump 36 and flow meter 37. Means for sending unwanted liquid to a drain is provided at 38. A check valve 39 is provided on conduit 35 near the end through which the doctor passes out into vessel 1. Additionally the unit has a mixer 40, Vag/pH probe 41 and a heating coil 47 for use when the vessel 1 is below it.

For the sixth step (heat cycle step) (box 7 of FIG. 1) vessel 1 returns to station C which in this step is used as a heat exchanger. In this step the emulsion passes along conduit 26 to plate and frame heat exchanger 42. Heat exchanger 42 has hot water entry and exit means at 43 and 44 respectively and has a conduit 45 along which emulsion passes as it returns to vessel 1. In the sixth step the temperature of the emulsion is increased from about 40° C. to 60°–65° C. before being cooled to 40°–43° C. The temperature is raised gradually and several passes through the heat exchanger are required. The upper temperature is typically held for 20 minutes and the whole duration of the sixth step is about 1 hour.

From the sixth step vessel 1 proceeds to station D for addition of further materials (final doctors) in the seventh step (box 8 of FIG. 1), additional gelatin may need to be added at this step. This completes the process and the finished product travels via the delivery system (box 9 of FIG. 1) to the coating apparatus (not shown in the drawings). When vessel 1 is emptied of all the emulsion it is cleaned and returned to the start of the process again.

Heat exchanger 42 can be used initially to melt the gelatin. Some products require heating during doctoring (fifth step).

The invention has been described in detail with particular reference to preferred embodiments thereof, but it will be understood that variations and modifications can be effected within the spirit and scope of the invention.

We claim:

1. A method for supplying liquid to one or more pieces of apparatus characterized in that one or a plurality of vessels visit one or more preparation stations until the liquid is prepared and the liquid when prepared is continually supplied to the apparatus in batches by said one or a plurality of vessels, the rate of liquid preparation and the vessel movements being matched to the requirements of each preparation station.

2. A method according to claim 1 for the preparation of a liquid for supplying to one or more pieces of apparatus using such a liquid characterized in that a plurality of vessels visit one or more preparation stations.

3. A method according to claim 1 characterized in that the liquid being prepared is a coating dispersion.

4. A method according to claim 1 characterized in that one or a plurality of vessels are moved automatically subject to a central control.

5. A method according to claim 1 characterized in that said one or a plurality of vessels are moved by conveyor.

6. A method according to claim 1 characterized in that said one or a plurality of vessels are raised into position at said one or more preparation stations.

7. A method according to claim 6 characterized in that said one or a plurality of vessels are weighed at least one preparation station.

8. A method according to claim 1 characterized in that the capacity of a vessel is in the range 50 to 1000 liters.

9. A method according to claim 3 characterized in that the coating dispersion is coated onto a photographic support.

10. A method according to claim 1 wherein the method is used to make a photosensitive silver halide emulsion.

11. A method for supplying liquid to one or more pieces of apparatus characterized in that one or a plurality of vessels visit one or more preparation stations until the liquid is prepared and the liquid when prepared is continually supplied to the apparatus in batches by said one or a plurality of vessels, the rate of liquid preparation and the vessel movements being matched to the requirements of each piece of apparatus.

12. A method according to claim 11 for the preparation of a liquid for supplying to one or more pieces of apparatus using such a liquid characterized in that a plurality of vessels visit one or more preparation stations.

13. A method according to claim 11 characterized in that the liquid being prepared is a coating dispersion.

14. A method according to claim 11 characterized in that said one or a plurality of vessels are moved automatically subject to a central control.

15. A method according to claim 11 characterized in that said vessels are moved by conveyor.

16. A method according to claim 11 characterized in that said one or a plurality of vessels are raised into position at said one or more preparation stations.

17. A method according to claim 6 characterized in that said one or a plurality of vessels are weighed at at least one preparation station.

18. A method according to claim 1 characterized in that the capacity of a vessel is in the range 50 to 1000 liters.

19. A method according to claim 3 characterized in that the coating dispersion is coated onto a photographic support.

20. A method according to claim 1 wherein the method is used to make a photosensitive silver halide emulsion.

21. A method for supplying liquid to one or more pieces of apparatus characterized in that one or a plurality of vessels visit one or more preparation stations until the liquid is prepared and the liquid when prepared is continually supplied to the apparatus in batches by said one or a plurality of vessels, the rate of liquid preparation and the vessel movements being matched to the requirements of each preparation station.

22. A method according to claim 21 characterized in that the liquid being prepared is a coating dispersion.

23. A method according to claim 21 characterized in that said one or a plurality of vessels are moved automatically subject to a central control.

24. A method according to claim 1 characterized in that said one or a plurality of vessels are moved by automatic guided vehicle.

25. A method according to claim 1 characterized in that said one or a plurality of vessels are moved by conveyor.

26. A method according to claim 11 characterized in that said one or a plurality of vessels are moved by conveyor.

27. A method according to claim 1 characterized in that said one or a plurality of vessels are moved by automatic guided vehicle.

* * * * *